United States Patent [19]

Bocek

[11] 3,889,292

[45] June 10, 1975

[54] APPARATUS FOR MAKING MULTIPLE ALPHANUMERIC COPIES OF A BINARY CODED MESSAGE

[75] Inventor: Robert P. Bocek, Penfield, N.Y.

[73] Assignee: Xerox Corporation, Stamford, Conn.

[22] Filed: Sept. 21, 1970

[21] Appl. No.: 73,817

[52] U.S. Cl. .................. 360/15; 346/74 ES; 360/40; 360/74; 360/79

[51] Int. Cl. ..... G11b 5/86; G11b 5/18; G11b 31/00

[58] Field of Search .............. 179/100.2 E, 100.2 S; 178/17 A, 111, 6.61; 235/92 PE; 197/19; 340/174.1 K; 346/74 MP, 74.1, 74 ES; 360/15, 40, 74, 79

[56] References Cited

UNITED STATES PATENTS

| | | | |
|---|---|---|---|
| 2,604,549 | 7/1952 | Begun | 179/100.2 E |
| 2,959,638 | 11/1960 | Sims, Jr. | 346/74 MP |
| 2,976,372 | 3/1961 | Sampson | 179/100.2 E |
| 3,413,624 | 11/1968 | Murdoch et al. | 340/174.1 K |

*Primary Examiner*—Raymond F. Cardillo, Jr.

[57] ABSTRACT

Non-impact recording apparatus having multiple copy capability. The apparatus is characterized by the provision of a magnetic tape unit operative to automatically cycle a coded message a predetermined number of times past a read/write head. The output from the read/write head operates the recorder to produce a hard copy of the message for each cycle.

4 Claims, 3 Drawing Figures

APPARATUS FOR MAKING MULTIPLE ALPHANUMERIC COPIES OF A BINARY CODED MESSAGE

BACKGROUND OF THE INVENTION

This invention relates, in general, to alphanumeric recording apparatus and, more particularly, to multiple copy capability for such apparatus.

The general object of this invention is to provide alphanumeric recording apparatus capable of making multiple copies of a binary coded message.

It is a more particular object to provide an improved magnetic tape transport for use with an alphanumeric recording apparatus.

Another object of the invention is to provide a non-impact alphanumeric recording apparatus having multiple copy capability.

Other objects and advantages of the present invention will become more apparent from reading the following detailed description in connection with the drawings forming a part hereof.

DETAILED DESCRIPTION OF THE PREFERRED EMBODIMENT OF THE INVENTION

Figure 1:
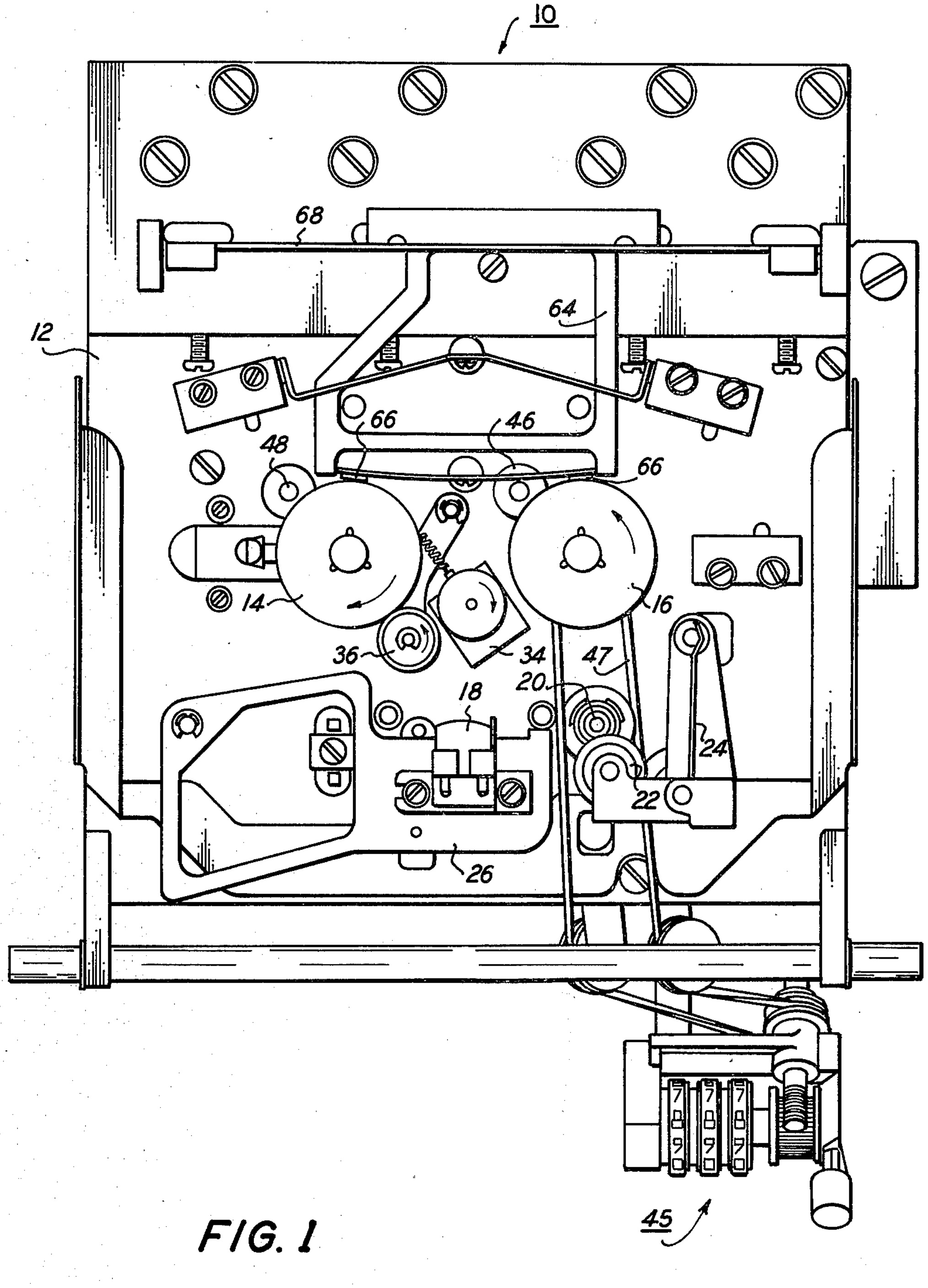
FIG. 1 is a top plan view of a tape transport with its housing removed.
Figure 2:
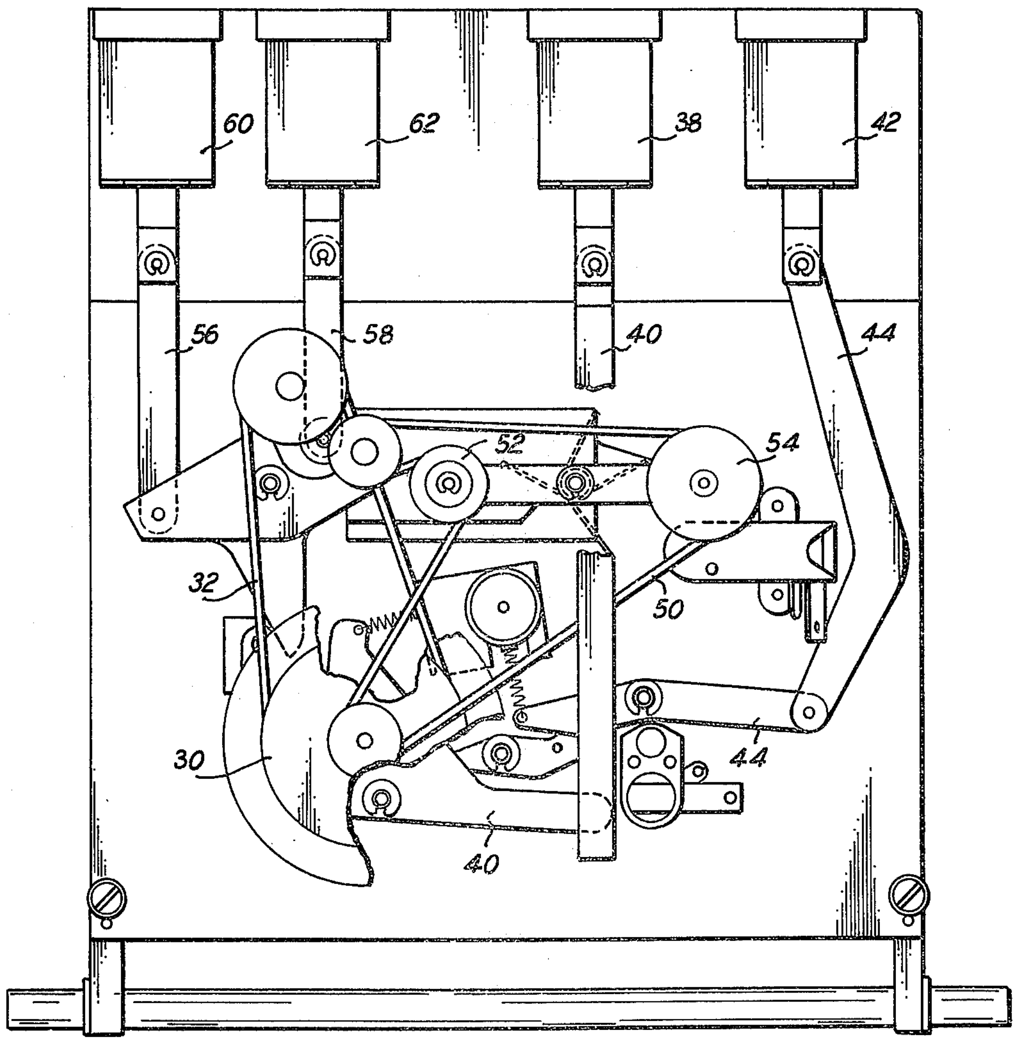
FIG. 2 is a bottom plan view of the tape transport illustrated in FIG. 1.
Figure 3:
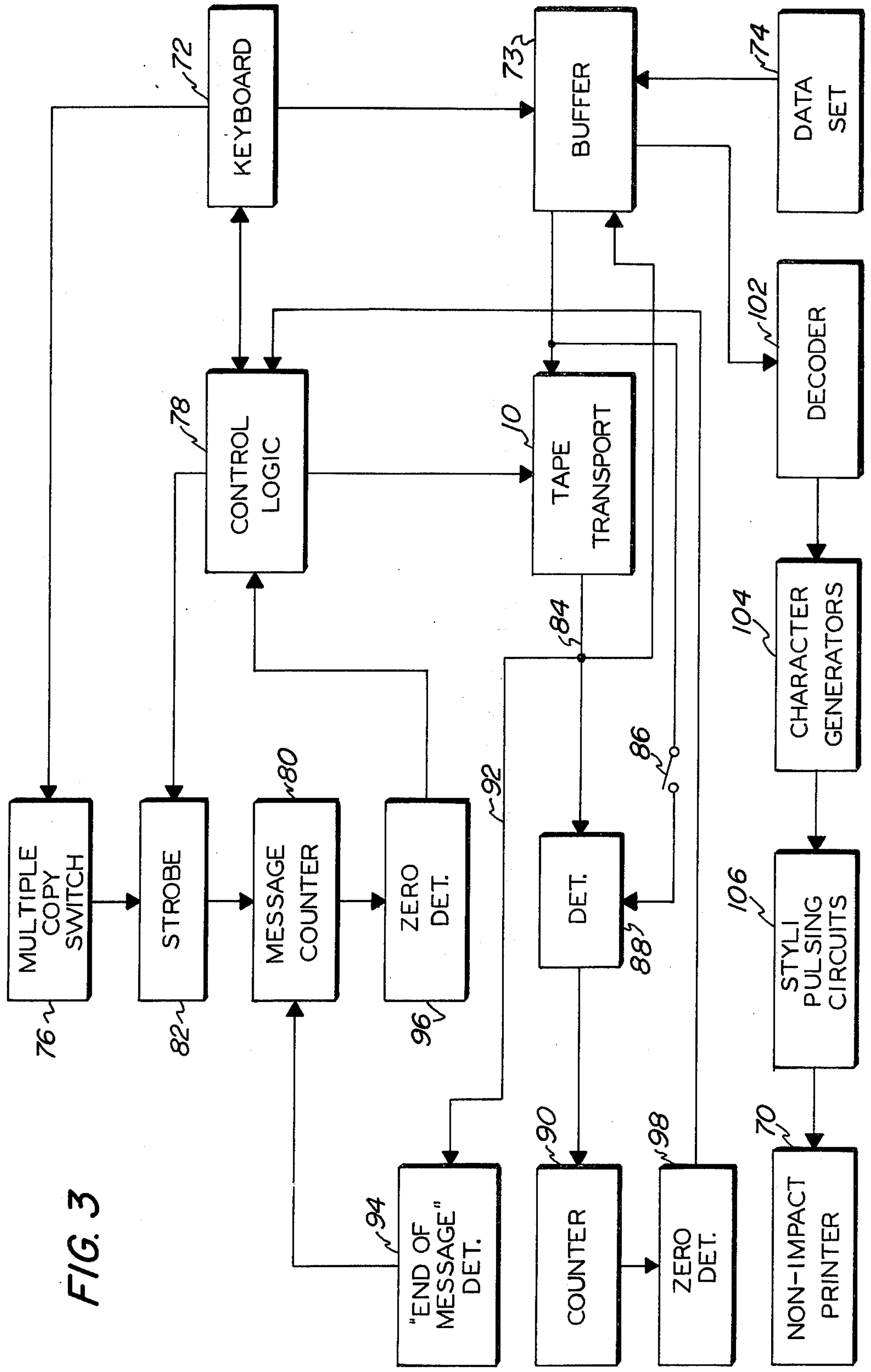
FIG. 3 is a schematic block diagram illustrating apparatus for making multiple alphanumeric copies of a coded message.

Referring to the drawings, especially FIGS. 1 and 2, reference character 10 designates generally a tape transport comprising a frame member 12 having rotatably supported thereon a supply spindle 14 and a take-up spindle 16. As presently contemplated, the spindles are designed for use in transporting a magnetic tape contained in a standard cassette (not shown), however, other tape systems as well as magnetic recording media may be employed.

The tape is transported or spooled past a read/write head 18 by means of a capstan 20 cooperating with a pinch roller 22 which is normally biased into engagement therewith by means of a spring member 24. The read/write head 18 is movably supported by a bracket structure 26 such that the aforementioned cassette can be properly installed or removed.

As shown in FIG. 2, motive power to the capstan 20 is provided by drive motor 28 via a capstan pulley and flywheel combination generally indicated at 30, which combination is operatively connected thereto by a belt 32. The motor as presently contemplated is an AC synchronous unit capable of producing a torque of approximately 0.40 inch ounces at 1800 rpm. With the capstan pinch roller 22 disengaged from the capstan 20 and the read/write head moved out of contact from the tape, the tape can be moved in a fast forward or reverse direction for the purpose of quickly positioning the tape at a desired position relative to the read/write head. The high speed movements are accomplished through a drive member 34 (FIG. 1) the position of which can be shifted so as to directly impart counterclockwise rotation to the take-up spindle 16 or clockwise rotation to the supply spindle 14 indirectly via an idler member 36.

Shifting of the drive member 34 is brought about by means of a fast forward solenoid 38 and associated latching mechanism 40 and a fast reverse solenoid 42 and associated latching mechanism generally indicated at 44.

A footage counter mechanism 45 operatively connected to the spindle 16 via a drive belt 47 cooperates with the fast and slow drives in order to locate a particular message on the tape or other record media.

Slow forward and reverse movement of the tape is provided for the purpose, in the case of the former, of winding the tape onto the take-up spool during the reading or writing of coded information on the tape and in the case of the latter, of locating the beginning of a message, in a manner to be discussed hereinafter. A slow (approximately 4 inches per second) forward drive member 46 (FIG. 1) imparts counterclockwise rotation directly to the spindle 16 while a slow (approximately 4 inches per second) reverse or rewind drive member 48 imparts clockwise rotation directly to the spindle 14. A drive belt 50 motion to which is imparted by a low speed pulley 51 carried by the capstan 20 interconnects low speed pulleys 52 and 54 carried, respectively, by the drive members 46 and 48. The slow speed drive members 46 and 48 are normally disengaged from the spindles 14 and 16 and are adapted to be brought into contact therewith, obviously at different times depending upon the mode of operation of the tape transport, through manipulation of latching mechanisms 56 and 58 actuatable, respectively, by a slow forward solenoid 60 and a slow rewind solenoid 62.

A structure 64 having a pair of friction pads 66 engageable with the peripheries of the spindles 14 and 16 serves to break the movement of the spindles during operation of the tape transport. Each of the solenoids 38, 42, 60 and 62 is attached to a member 68 of the structure 64 so that when any one of the solenoids is actuated the braking action of the structure 64 is removed.

Information is recorded on the tape or other record media in the form of appropriate binary codes uniquely identifying alphanumeric symbols. The coded information may be employed in accordance with the present invention for operating an electrographic printer 70 forming a part of a computer terminal including a keyboard 72.

The keyboard 72 may generate the aforementioned binary codes, each code corresponding to the alphanumeric symbol of an actuating key of the keyboard. These binary codes such as used in the "American Standard Code For Information Interchange" are recorded on the magnetic tape by means of the read/-write head 18 (FIG. 1). In order to write the coded inputs onto the tape with uniform spacing between characters, the encoded data from the keyboard is transmitted to the tape by a buffer storage device 73. Transmission from the buffer storage device which forms no part of the present invention preferably occurs one data block at a time. Each data block has a predetermined number of characters compatible with the storage device. Five hundred and twelve characters each containing eight bits including one parity bit presently constitute one data block. A unique code is recorded on the tape at the end of each data block to thereby demarcate the end of each data block. In operation the tape transport is stopped after the recording of each "end of block" code thereby leaving a portion of the tape blank due to the inherent delay in braking action. This blank portion immediately follows the end of block code and if the message contains more than one data block, it immediately precedes the next data block. There will also be a blank portion at the beginning of the first data block of each message. These blank portions delineate the beginning of a data block and are employed in a manner to be discussed hereinafter to make multiple copies of a recorded message. At the end of a message, an "end of message" code is recorded on the tape through actuation of a special key, not shown, of the keyboard 72.

Once a complete message has been recorded on the tape, either via the keyboard 72 or a data set 74, the tape can be used in conjunction with the tape transport 10 and the printer 70 to make multiple copies of the message. To this end, the keyboard terminal 72 is provided with a manually operative, multiple copy switch 76 having a number of operative positions or settings, for example, four.

Control logic 78 generally indicated in block form, utilizes the setting of the copy switch 76 to increment a counter 80. This is accomplished through appropriate energization of a strobing device 82 which generates electrical pulses in accordance with the setting of the multiple copy switch 76. For example, if the switch 76 is set at four, the counter 80 would be preset to four. The foregoing, as will be better understood hereinafter, controls the number of times this message on the tape will be sequentially recorded by the printer 70. The control logic comprises router switches for direction of data flow forward and reverse decision circuitry, initialization logic circuitry and associated logic elements and other electronic components. These components are not explicitly indicated or described since those skilled in the manipulation of binary data, presented with the required functions to be accomplished, could conceive of various workable embodiments.

The control logic 78, via the aforementioned decision making circuitry, pulses the drive solenoids 38, 42, 60 and 62 in accordance with the function taking place. For the purpose of making multiple copies, the fast forward and reverse solenoids are employed for initially positioning the tape at a desired location. This is accomplished via manually actuatable buttons (not shown) located on the tape transport. The foregoing operation is not required when the data set is used for writing on the tape, as will be discussed hereinafter.

The slow forward and reverse solenoids 38 and 42 are automatically pulsed by the control logic 78 in order to cycle the tape between the beginning and end of the message which is to be copied. As the tape is moved past the read/write head 18 the data thereon flows via a lead 84 and switch 86 to an end of block detector 88 which senses the aforementioned end of block codes. For each such code detected, the detector increments an up-down counter 90. The data from the tape also flows via lead 92 to an end of message detector 94 which decrements the counter 80. The same data is also used to actuate the printer 70 in a manner to be discussed hereinafter.

A zero detector 96 operatively connected to the message or copy counter 80 senses the presence of a zero count therein and transmits the information to the control logic. When a zero is sensed the control logic causes the tape transport to cease cycling of the tape between the ends of the message.

If the count in the counter 80 is other than zero, the control logic 78 through the slow reverse decision circuitry causes the tape transport to be switched from a slow forward mode to a slow reverse mode. In this mode the detector 88 by sensing the aforementioned "beginning of block" spaces decrements the up-down counter for each such space. A zero detector 98 operatively connected to the counter 90 operates through the control logic to switch the tape transport to the slow forward mode of operation. The beginning of block detector operates in conjunction with an eight bit counter (not shown) such that it is actuated when no bits are received prior to the resetting of the eight bit counter. In other words the detector 98 senses the absence of data or the beginning of block spaces.

The printer 70 while herein contemplated as a non-impact, electrographic printer, may be of the impact type. The printer 70 comprises a recording assembly, not shown, made up of a linear array of conductive styli or pin electrodes used to deposit latent electrostatic charge patterns on a recording medium in the conventional electrographic manner. The styli are selectively pulsed by suitable electronics to be described hereinafter as the recording assembly moves through the recording zone. As each stylus is so pulsed a corresponding electrostatic charge pattern is placed on the recording medium in the configuration of the styli's recording face. Usually the number of styli will be seven or nine such as during the movement through one character space, a $5 \times 7$ or $7 \times 9$ matrix of charge patterns is possible. In this manner, alphanumeric characters may be recorded as an array of dots or points of electrostatic charge with subsequent development by application of electroscopic marking particles thereto.

The styli themselves may contact the recording medium during the recording process or may be slightly spaced therefrom. The spacing of the styli from the recording medium or, in the case of contact, the amount of pressure applied by styli on the recording medium is governed in part by the position relative to a backing electron, not shown.

The binary output from the buffer storage device 73 is routed to a decoder 102 which provides a single output pulse for each character to be recorded by the printer 70. The output pulse is supplied to a character generator 104 which, in turn, conditions styli pulsing circuits 106.

The character generator 104 may be a matrix of switching elements, such as flip-flops or magnetic cores, which operate to distribute the decoder output pulse to a particular group of switching elements which energize the styli to record the desired alphanumeric characters. The details of the decoder, character generator and pulsing circuits have not been set forth in detail because they are well known to those skilled in the art.

In accordance with the present invention, multiple copies of messages transmitted via the data set 74 can be made automatically. When the terminal is set in this mode of operation, the switch 86 is closed, consequently, the end of block detector is operative to count the number of blocks as the data is being transmitted to the tape via the data set 74. In this mode if the multiple copy switch has been set to a number greater than 1 for example, 3, then three copies would be provided by the recorder 70.

What is claimed is:

1. Apparatus for making multiple alphanumeric copies of a binary coded message contained on a magnetic recording medium, said apparatus comprising:

means including means for reading said binary coded message;

means for moving the message portion of said magnetic recording medium past said reading means;

means for conditioning said last-mentioned means for cycling said message path said reading means a predetermined number of times;

recording means responsive to said means including reading means for forming alphanumeric characters on a recording web each time said message moves past said reading means;

means responsive to said conditioning means for transporting said record medium between the beginning and end of said message and past said reading means to thereby produce multiple copies of said message in accordance with said conditioning of said apparatus;

means for writing binary codes on said magnetic recording medium, said means comprising controls for dividing messages of a predetermined length into data blocks and providing a code at the end of each data block followed by a space; and said transporting means comprising means for sensing the number of said codes and said spaces to thereby control the transporting of said record medium between the beginning and end of message.

2. Apparatus according to claim 1, wherein said conditioning means comprises a switch for presetting a counter in accordance with the setting of said switch; and said apparatus further comprising means for decrementing said counter each time a message is formed on said web and means responsive to said decrementing means for stopping said transporting means.

3. In combination, tape transport apparatus comprising:

a supply spindle;

a take-up spindle;

means for spooling magnetic tape past a read/write head in a forward direction at a uniform speed;

means cooperating with said spooling means for driving said take-up spindle for winding magnetic tape onto a take-up device carried thereby;

means for driving said supply spindle for winding tape in a reverse direction onto a tape supply device carried by said supply spindle;

said tape having a binary coded message recorded thereon which is divided into a plurality of data blocks;

an up-down counter;

means for detecting the number of data blocks contained in said message and incrementing said counter as the tape is being wound onto said take-up device and decrementing said counter as said tape is being wound onto said supply device;

means for detecting the number of times a complete message has been moved past said head in the forward direction, said detecting means operating to decrement a counter settable to a predetermined count representing the number of times the message is to be moved past said head;

means for presetting said last-mentioned counter in accordance with said predetermined count;

means responsive to the operation of said counters for actuating said spooling means and said supply spindle drive means to thereby cycle the coded message portion of the tape past said read/write head;

recording apparatus for making alphanumeric copies of the message on said tape, said copies being equal to said predetermined number of times said tape is moved past said read/write head, and means for setting said counter to said predetermined count.

4. Apparatus according to claim 3 further including, means for recording said binary message on said magnetic tape.

* * * * *